(12) United States Patent  
Broden et al.

(10) Patent No.: US 8,448,519 B2
(45) Date of Patent: May 28, 2013

(54) INDUSTRIAL PROCESS TRANSMITTER WITH HIGH STATIC PRESSURE ISOLATION DIAPHRAGM COUPLING

(75) Inventors: David Andrew Broden, Andover, MN (US); David Anthony Horkey, Mound, MN (US)

(73) Assignee: Rosemount Inc., Eden Prairie, MN (US)

( * ) Notice: Subject to any disclaimer, the term of this patent is extended or adjusted under 35 U.S.C. 154(b) by 371 days.

(21) Appl. No.: 12/924,761

(22) Filed: Oct. 5, 2010

(65) Prior Publication Data

US 2012/0079884 A1 Apr. 5, 2012

(51) Int. Cl.
*G01L 9/00* (2006.01)

(52) U.S. Cl.
USPC .................. 73/717; 73/700; 73/715

(58) Field of Classification Search
None
See application file for complete search history.

(56) References Cited

U.S. PATENT DOCUMENTS

| | | | |
|---|---|---|---|
| 2,841,984 A | 7/1958 | Green | |
| 4,109,535 A | 8/1978 | Reed et al. | |
| 4,586,383 A * | 5/1986 | Blomquist | 73/706 |
| 4,745,810 A | 5/1988 | Pierce et al. | |
| 4,833,922 A | 5/1989 | Frick et al. | |
| 5,495,769 A | 3/1996 | Broden et al. | |
| 5,583,294 A | 12/1996 | Karas | |
| 5,670,722 A | 9/1997 | Moser et al. | |
| 5,922,965 A | 7/1999 | Behm et al. | |
| 6,050,145 A | 4/2000 | Olson et al. | |
| 6,295,875 B1 | 10/2001 | Frick et al. | |
| 6,457,367 B1 | 10/2002 | Behm et al. | |
| 6,487,912 B1 | 12/2002 | Behm et al. | |
| 6,675,655 B2 | 1/2004 | Broden et al. | |
| 6,901,803 B2 | 6/2005 | Fandrey | |
| 7,036,381 B2 * | 5/2006 | Broden et al. | 73/708 |
| 7,373,831 B2 * | 5/2008 | Broden | 73/715 |
| 7,412,893 B2 * | 8/2008 | Hedtke | 73/730 |
| 7,472,608 B2 * | 1/2009 | Hedtke | 73/861.63 |
| 2006/0278005 A1 | 12/2006 | Broden et al. | |
| 2007/0073417 A1 | 3/2007 | Hedtke | |
| 2010/0083731 A1 * | 4/2010 | Hedtke | 73/1.57 |

OTHER PUBLICATIONS

International Search Report and Written Opinion for Application Serial No. PCT/US2011/054923, filed on Oct. 5, 2011.

* cited by examiner

*Primary Examiner* — Lisa Caputo
*Assistant Examiner* — Jermaine Jenkins
(74) *Attorney, Agent, or Firm* — Kinney & Lange, P.A.

(57) ABSTRACT

A process transmitter for measuring a process variable comprises a sensor module and a static pressure coupling. The sensor module comprises a sensor for measuring a process variable of an industrial process and for generating a sensor signal. The sensor includes a hydraulic fluid inlet within the module. The static pressure coupling is connected to the sensor module and comprises a isolator fitting, a process fluid coupling and an isolation diaphragm. The isolator fitting is inserted into the sensor module and connected to the hydraulic fluid inlet. The process fluid coupling is joined to the isolator fitting. The isolation diaphragm is positioned between the isolator fitting and the process fluid coupling outside of the sensor module.

25 Claims, 8 Drawing Sheets

INDUSTRIAL PROCESS TRANSMITTER WITH HIGH STATIC PRESSURE ISOLATION DIAPHRAGM COUPLING

BACKGROUND

The present invention relates generally to industrial process transmitters for use in industrial process control systems. More particularly, the present invention relates to process connections for coupling transmitters to high static pressure processes.

Process instruments are used to monitor process parameters, such as pressure, temperature, flow and level, of process fluids used in industrial processes. For example, process transmitters are typically employed in industrial manufacturing facilities at multiple locations to monitor a variety of process parameters along various production lines. Process transmitters include sensors that produce an electrical output in response to physical changes in the process parameter. For example, pressure transmitters include pressure transducers that produce an electrical output as a function of the pressure of a process fluid, such as in water lines, chemical tanks or the like. Each process transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room. Configured as such, the process parameter can be regulated from the control room by including automated switches, valves, pumps and other similar components in the process control system and the control loop.

Pressure sensors used in pressure transmitters include a flexible sensor element, such as an electrode plate or a piezoresistor, that deflects in response to a pressure change. The sensor element is connected to the process fluid through a simple hydraulic system that communicates the process fluid pressure to the sensor. The hydraulic system comprises a sealed passageway in which the sensor element is positioned at a first end, and a flexible isolation diaphragm is positioned at a second end to engage the process fluid. The sealed passageway is filled with a precise amount of hydraulic fluid that adjusts the position of the sensor element as the process fluid influences the isolation diaphragm. As the pressure of the process fluid changes, the position of the sensor element changes, resulting in a change in capacitance or resistance of the pressure sensor. The electrical output of the pressure sensor is related to the capacitance or resistance and thus changes as the process fluid pressure changes. Differential pressure sensors typically require two hydraulic systems to bring separate pressures to opposite sides of a single sensor. Typically, a process flange having receptacles for process fluid lines is bolted to the base of the transmitter to align the process fluid with the isolation diaphragms of the differential hydraulic systems. Thus, the transmitter is coupled to the process in such a manner that the process fluid pressure is transmitted across the flange coupling.

Frequently it is desirable to connect transmitters to processes having extremely high static pressures. For example, deeply penetrating oil wells require large line pressures to transport the oil to surface levels. In particular, sub-sea oil wells require line pressures as high as approximately 15,000 pounds per square inch (psi) [~103.4 Mega-Pascals (MPa)] to approximately 20,000 psi (~137.9 MPa). The bolted connection between the flange and the transmitter base typically cannot seal at such high pressures due to stress limitations of the bolts and deformable seals used therebetween. Disruption of this seal causes process fluid to undesirably leak from the process transmitter coupling. Improvements to this seal are difficult in differential pressure transmitters where the isolation diaphragms are configured in an aligned-surface, or coplanar, arrangement within the base of the transmitter. As such, process transmitters are limited in their applicability by the pressures of the processes to which they can safely be coupled.

SUMMARY

A process transmitter for measuring a process variable of a process fluid having high static pressures comprises a sensor module and a static pressure coupling. The sensor module comprises a sensor for measuring a process variable of an industrial process and for generating a sensor signal. The sensor includes a hydraulic fluid inlet within the module. The static pressure coupling is connected to the sensor module and comprises an isolator fitting, a process fluid coupling and an isolation diaphragm. The isolator fitting is inserted into the sensor module and connected to the hydraulic fluid inlet. The process fluid coupling is joined to the isolator fitting. The isolation diaphragm is positioned between the isolator fitting and the process fluid coupling outside of the sensor module.

DETAILED DESCRIPTION

Figure 1:
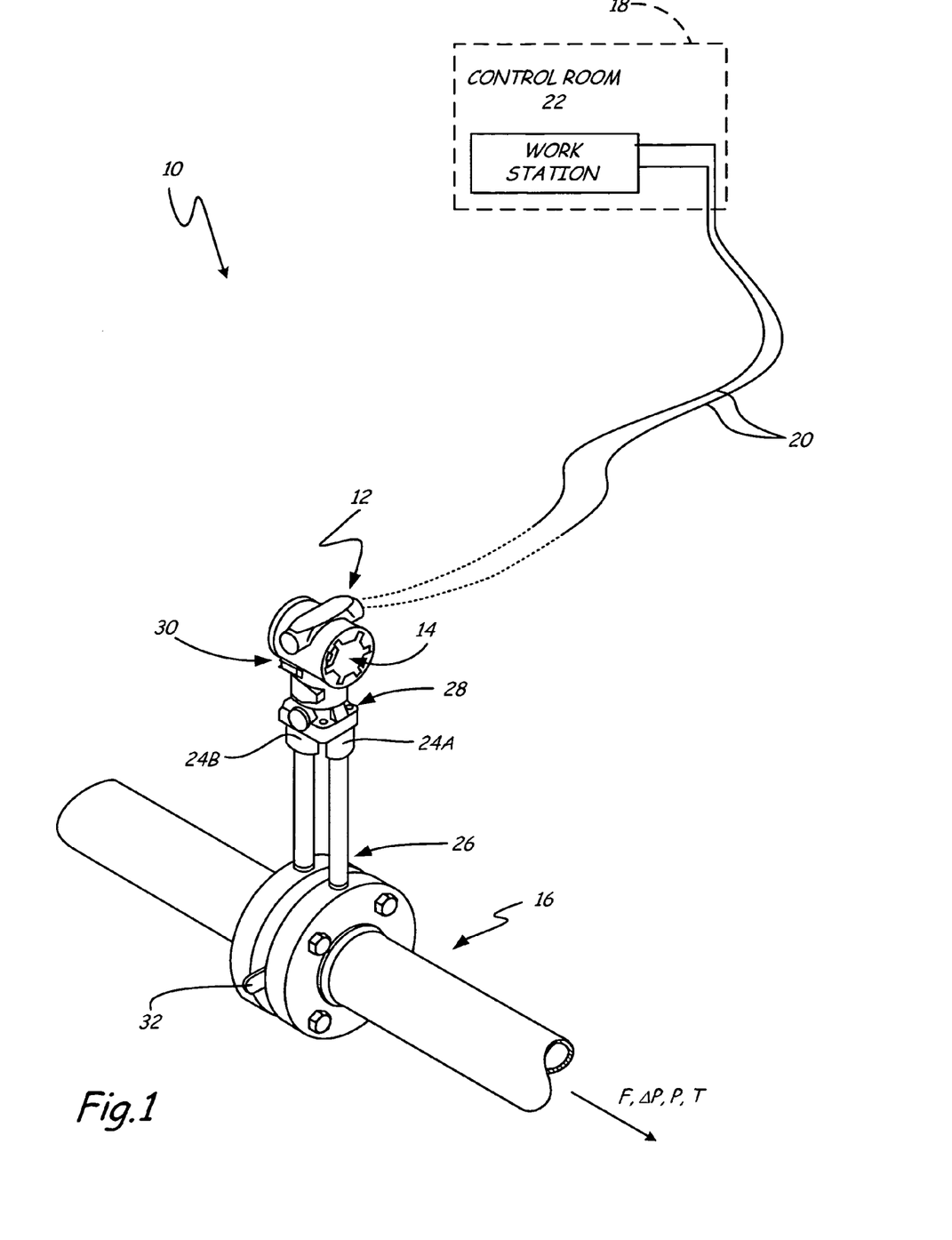
FIG. 1 shows a process control system including a planar-mounted pressure transmitter connected to a control room and to high static pressure isolation diaphragm sub-assemblies of the present invention.

FIG. 1 shows process control system 10 of the present invention having process transmitter 12 that uses high static pressure isolation diaphragm sub-assemblies to connect to high pressure fluid F. Process control system 10 includes process transmitter 12, instrument display 14, piping 16 and control room 18. Control room 18, which is connected to transmitter 12 with control loop 20, includes work station 22. Work station 22 includes various components for interacting with transmitter 12 such as a power supply and communications interfaces. Process transmitter 12 is connected to a process source, such as piping 16, to generate signals relating to process variables of process fluid F, such as differential pressure ΔP, static pressure P and temperature T, using various process variable sensors. Sub-assemblies 24A and 24B connect to piping 16 through impulse piping 26. Sub-assemblies 24A and 24B allow transmitter 12 to be connected to piping 16 when static pressure of fluid F is elevated to high levels.

Process transmitter 12 includes sensor module 28 and transmitter electronics module 30. Differential pressure ΔP is produced within the flow of process fluid F by a primary element, which in the embodiment shown comprises orifice plate 32. Orifice plate 32 includes a bore having a diameter smaller than that of piping 16 to produce a flow restriction. Relatively higher and lower pressures on either side of orifice plate 32 are communicated through impulse piping 26, and sub-assemblies 24A and 24B to sensor module 28. Sensor module 28 includes a differential pressure sensor, for sensing differential pressure ΔP. Sensor module 28 also includes a temperature sensor for sensing temperature T and a static pressure sensor for sensing pressure P. Differential pressure ΔP typically only reaches very small levels, such as approximately 5 psi (~34.5 kPa), while static pressure P may reach levels several thousand times higher. For example, sub-assemblies 24A and 24B can withstand static pressures P in excess of 20,000 psi (~137.9 MPa), which are often encountered in oil wells used in sub-sea applications. Sensor module 28 generates electrical signals based on output from the sensors, and transmits the signals to transmitter electronics module 30.

Information relating to differential pressure ΔP, static pressure P and temperature T can be obtained locally from transmitter 12 through use of display 14. Information can also be obtained remotely from transmitter 12 at control room 18. Transmitter 12 may be capable of communicating over both digital and analog control systems to transmit data to control room 18. Transmitter 12 is provided with integral electronics that enable electronics module 30 to communicate digitally with control room 18 over a wireless or wired network. In various embodiments, process transmitter 12 is capable of communicating over a HART®, WirelessHART® or FOUNDATION™ Fieldbus network protocol. Such digital communications protocols allow data for multiple process variables to be transmitted from transmitter 12 to control room 18. Workstation 22 also enables control room 18 to receive data from and transmit data to process transmitter 12 utilizing analog control loop 20. In one embodiment, process transmitter 12 is a two-wire transmitter that operates on a 4 mA to 20 mA loop. Work station 22 includes components, such as a digital processor, video display and keyboard, for operating transmitter 12 and manipulating the control loop signal relating to ΔP, P and T. Based on the data received from transmitter 12, control room 18 is able to adjust process parameters either through control loop 20 or another control loop. For example, control room 18 can adjust the flow of process fluid F by adjusting appropriate actively controlled valves connected to piping 16.

In the embodiment shown, pressure transmitter 12 comprises a COPLANAR™ differential pressure transmitter wherein sensor module 28 includes a flush-mount base for connecting with aligned-surface, or co-planar, isolation diaphragms in sub-assemblies 24A and 24B. Such configurations of the transmitter base are important to obtaining accurate differential pressure measurements. Sub-assemblies 24A and 24B allow high static pressures to be brought into fluid communication with pressure transmitter 12 without leakage, while preserving the integrity of the co-planar configuration.

Figure 2:
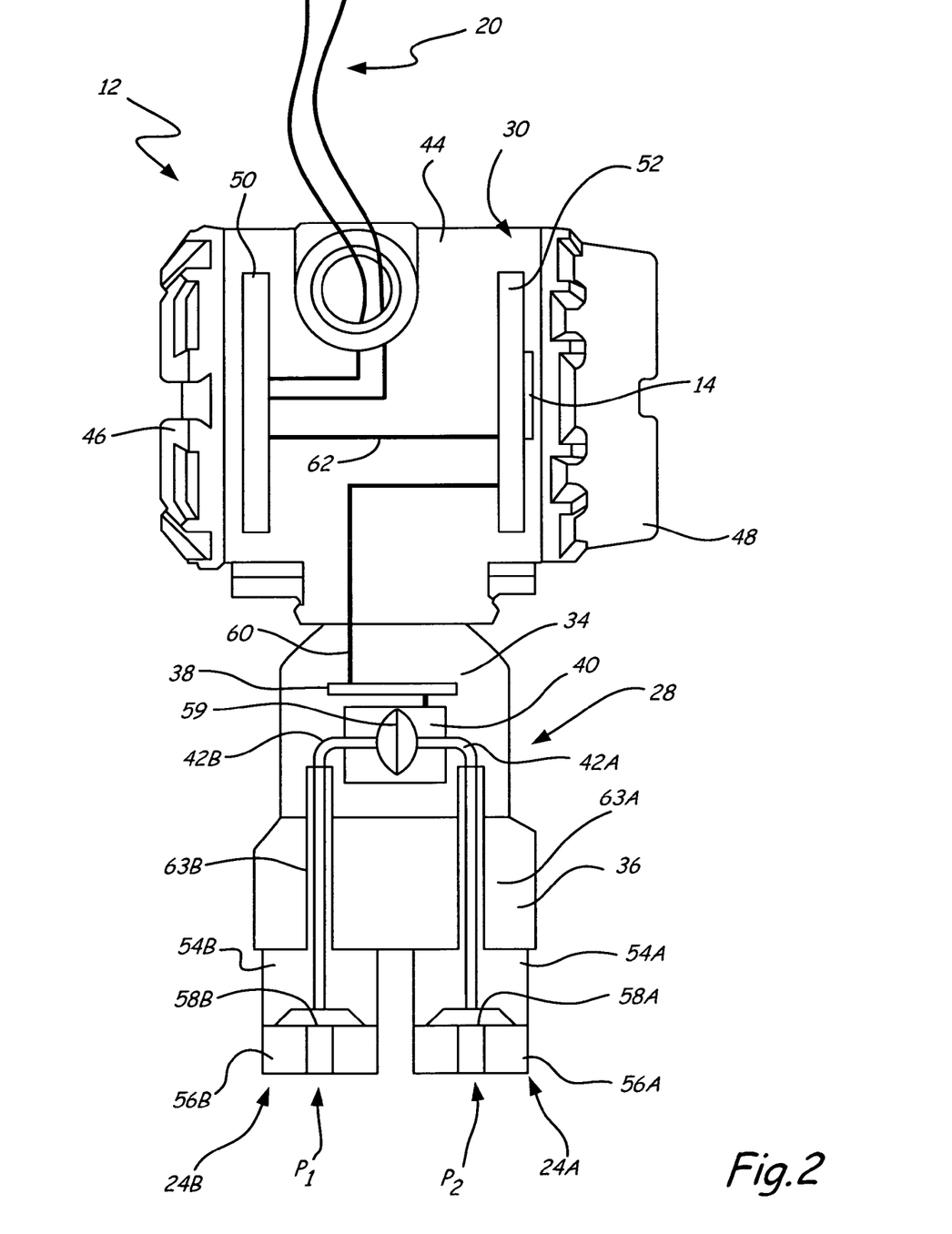
FIG. 2 is a schematic cross-sectional view of the pressure transmitter of FIG. 1 showing assembly of isolation diaphragm sub-assemblies.

FIG. 2 schematically shows one embodiment of pressure transmitter 12, sub-assemblies 24A and 24B, sensor module 28 and transmitter electronics module 30. Sensor module 28 includes housing 34, to which are connected base 36, sensor board 38, differential pressure sensor 40 and isolation tubes 42A and 42B. Transmitter electronics module 30 includes housing 44, cover 46, display cover 48, output interface 50 and transmitter circuitry 52. Sub-assembly 24A includes isolator fitting 54A, process fluid coupling 56A and isolation diaphragm 58A. Sub-assembly 24B includes similar components as sub-assembly 24A, but having a "B" designation. Pressures $P_1$ and $P_2$ are produced on either side of primary element 32 in piping 16 (FIG. 1).

Sensor board 38 and sensor 40 are mounted within housing 34 of sensor module 28. Housing 34 of sensor module 28 connects to housing 44 of electronics module 30 through, for example, a threaded connection. Similarly, covers 46 and 48 are connected to housing 44 through threaded connections that form flame-quenching seals, as are known in the art, to prevent escape of flames from within housing 44. Output interface 50 and transmitter circuitry 52 are mounted to housing 54 within transmitter electronics module 30. Differential pressure sensor 40, which includes flexible sensor element 59, is in electronic communication with sensor board 38. Sensor board 38 is in electronic communication with transmitter circuitry 52 through sensor cable 60. Sensor cable 60 extends through a fitting and a feed-through within the neck of housing 34 that seals the interior of housing 34 in a flame-proof manner. Such connections are known in the art and an example of such a fitting and feed-through connection is described in U.S. Pat. No. 6,457,367, which is assigned to Rosemount Inc. and is incorporated by this reference. Transmitter circuitry 52 is in electronic communication with output interface 50 through electronics cable 62. Output interface 50 connects transmitter 12 to wiring of control loop 20. In one embodiment, transmitter module 30, sensor board 38 and sensor 40 are configured as a multivariable transmitter as is described in U.S. Pat. No. 5,495,769 to Broden et al., which is assigned to Rosemount Inc., Eden Prairie, Minn. and is incorporated by this reference.

Base 36 of sensor module 28 is connected to isolator fittings 54A and 54B of sub-assemblies 24A and 24B, respectively, which connect to piping 16 (FIG. 1). Fittings 54A and 54B are inserted into openings extending through base 36 to enter the interior of housing 34. In various embodiments, fittings 54A and 54B are threaded into receiving bores 63A and 63B of base 36 or are force-fit into receiving bores 63A and 63B. Fittings 54A and 54B can also be brazed or welded to base 36. In any embodiment, fittings 54A and 54B form flame-quenching, or flame-proof, joints with bores 63A and 63B, respectively. Process fluid couplings 56A and 56B are joined to fittings 54A and 54B with a weld joint. In one embodiment, couplings 56A and 56B are threaded together with fittings 54A and 54B before being welded. Isolation diaphragms 58A and 58B are positioned between fittings 54A and 54B and couplings 56A and 56B, respectively.

In the embodiment shown, sensor 40 comprises a capacitance-based differential pressure cell in which flexible sensor element 59 comprises a diaphragm disposed between a pair of electrode plates. In one embodiment, sensor 40 comprises a metal-diaphragm type sensor as is described in U.S. Pat. No.

6,295,875 to Frick et al., which is assigned to Rosemount Inc., Eden Prairie, Minn. Sensor 40 is connected to fittings 54A and 54B with isolation tubes 42A and 42B, respectively, in which are disposed volumes of hydraulic fill fluid. The fill fluid is substantially incompressible to transmit pressures $P_1$ and $P_2$ to sensor 40 and typically comprises a silicone-oil hydraulic fluid, such as DC 200®, DC 704® or Syltherm XLT® silicone-oil as is commercially available from Dow Corning Corporation, Midland, Mich., USA. Isolation diaphragms 58A and 58B separate the fill fluid within isolation tubes 42A and 42B from pressures $P_1$ and $P_2$ of process fluid F. Physical changes in pressures $P_1$ and $P_2$ of process fluid F are sensed as differential pressure $\Delta P$ by sensor 40 through isolation diaphragms 58A and 58B and the hydraulic fill fluid within the isolator fittings 54A and 54B and isolation tubes 42A and 42B.

Sub-assemblies 24A and 24B extend outside of sensor module 28 to facilitate assembly of diaphragms 58A and 58B. In particular, diaphragms 58A and 58B are assembled with isolator fittings 54A and 54B and process couplings 56A and 56B, respectively, before sub-assemblies 24A and 24B are installed within base 36 of module 28. Access to diaphragms 58A and 58B is improved as they are moved outside of recesses within base 36 where they are typically installed in a co-planar transmitter. Thus, fittings 54A and 54B can be more securely attached to couplings 56A and 56B, respectively, thereby also securing diaphragms 58A and 58B. Once assembled, sub-assemblies 24A and 24B are inserted into receiving bores 63A and 63B of base 36.

Figure 3:
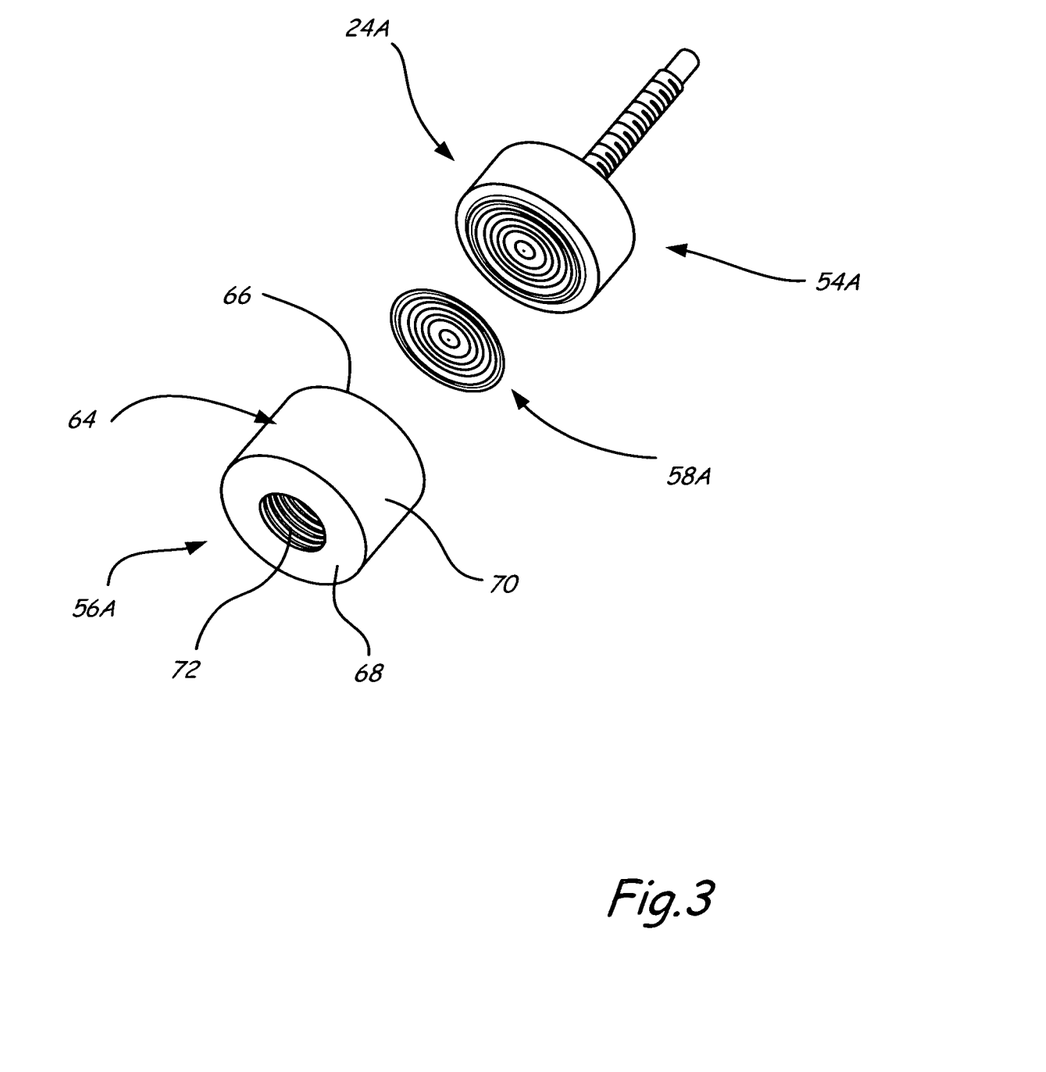
FIG. 3 shows an exploded view of an isolation diaphragm sub-assembly including an isolator fitting, a process fluid coupling and an isolation diaphragm.
Figures 4A, 4B, 4C:
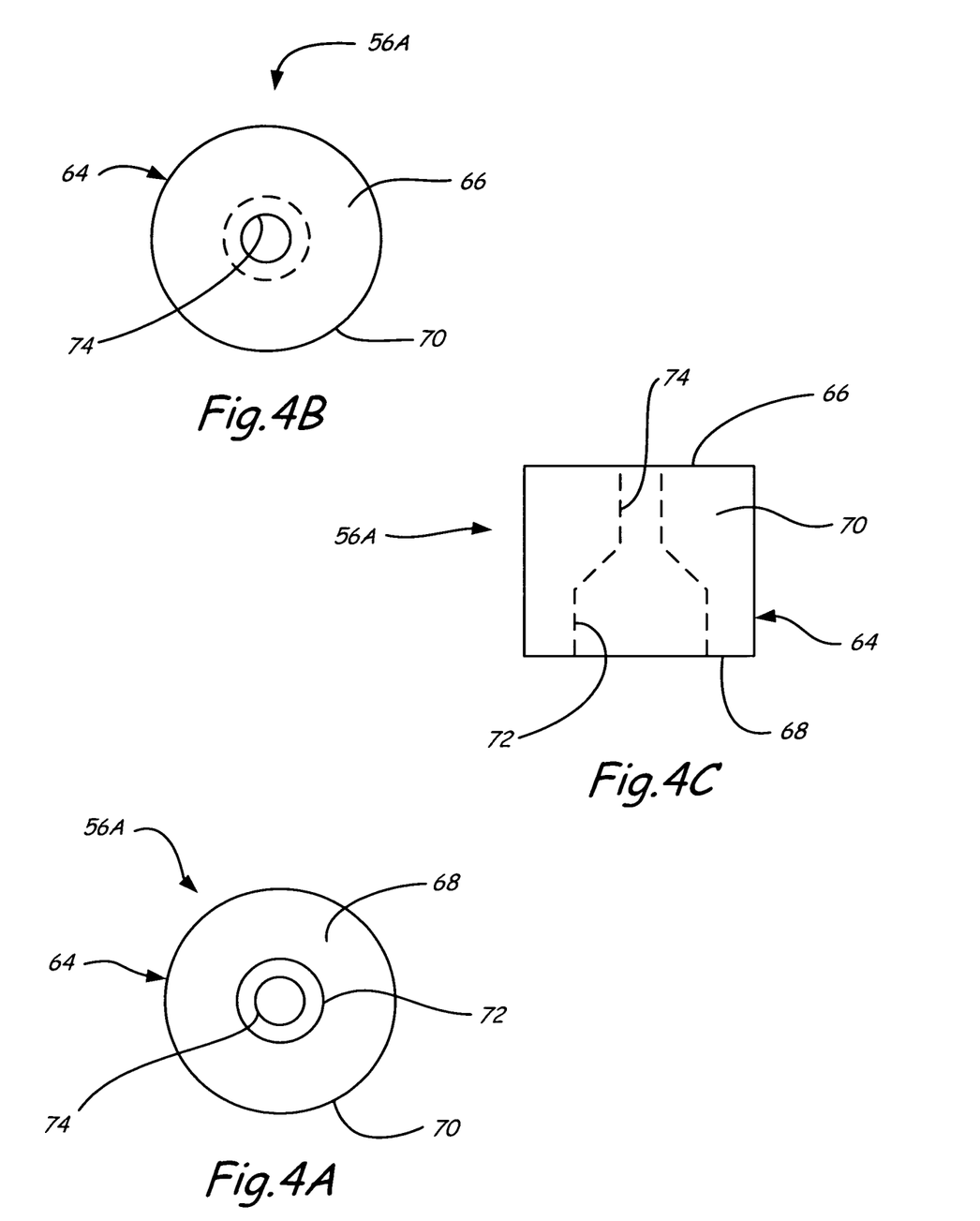
FIG. 4A shows a bottom view of the process fluid coupling of FIG. 3.
FIG. 4B shows a top view of the process fluid coupling of FIG. 3.
FIG. 4C shows a side view of the process fluid coupling of FIG. 3.
Figure 5A:
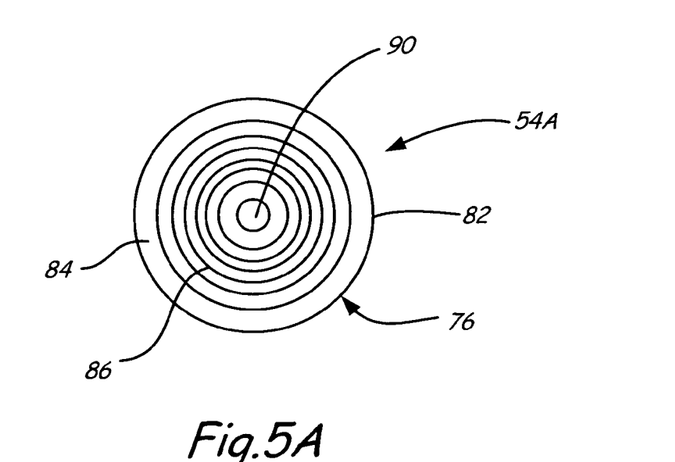
FIG. 5A shows a bottom view of the isolator fitting of FIG. 3
Figures 5B, 5C:
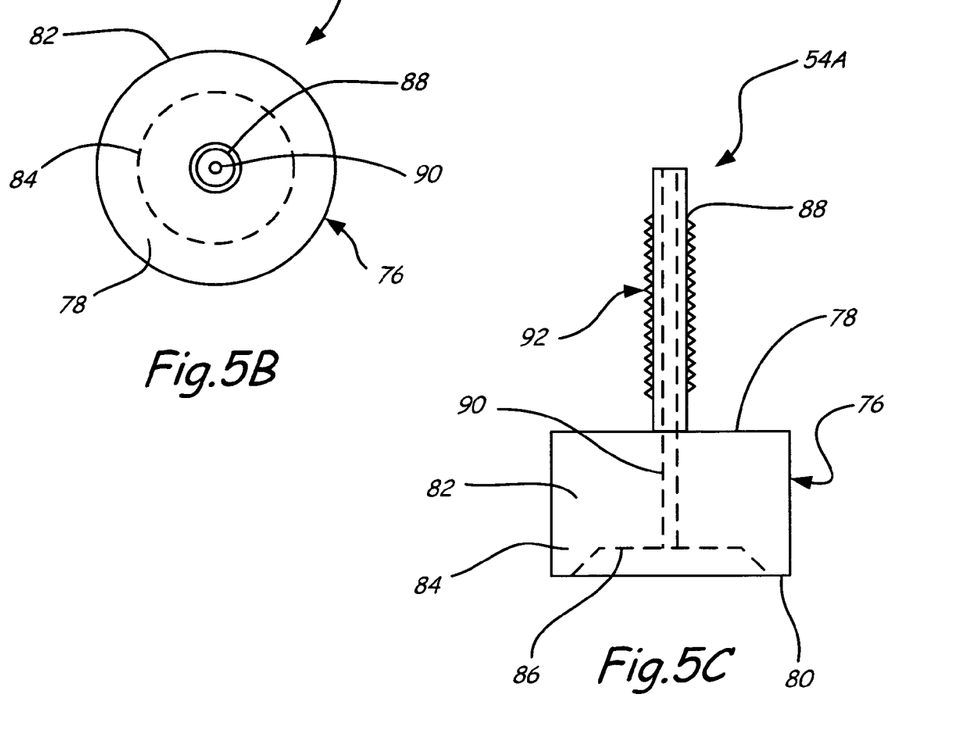
FIG. 5B shows a top view of the isolator fitting of FIG. 3.
FIG. 5C shows a side view of the isolator fitting of FIG. 3

FIG. 3 shows an exploded view of one embodiment of isolation diaphragm sub-assembly 24A including isolator fitting 54A, process coupling 56A, an isolation diaphragm 58A. FIGS. 4A-4C show top, bottom and side views of process coupling 56A, respectively. FIGS. 5A-5C show top, bottom and side views of isolator fitting 54A, respectively. FIGS. 3-5C are discussed concurrently.

Process coupling 56A includes coupler body 64, which includes first surface 66, second surface 68, side surface 70, process coupler 72 and through-bore 74. Coupler body 64 preferably comprises a cylindrical, or disk-shaped, body having circular end surfaces at first surface 66 and second surface 68. Side surface 70 comprises an annular wall that connects first surface 66 and second surface 68. However, in other embodiments, coupler body 64 may have other geometries, such as an octagonal body.

Through-bore 74 comprises a small diameter hole that extends into first surface 66. Process coupler 72 comprises a threaded bore having a diameter matching that of a threaded process coupler. Process coupler 72 is selected based on the type of process connection, such as piping 16, to which transmitter 12 is connected (FIG. 1). In one embodiment, process coupler 72 comprises a 0.5 in (~1.27 cm) national pipe thread (NPT) female pipe thread (FPT). In another embodiment, coupler 72 is configured to connect to a remote seal assembly, as are known in the art. However, in other embodiments, process coupler 72 may comprise a weld stub extending from second surface 68 over which a pipe may be fitted and welded.

Isolator fitting 54A includes extension body 76, first end 78, second end 80, side portion 82, isolator flange 84, corrugated pressure chamber face 86, elongate neck 88 and through-hole 90. Extension body 76 comprises a cylindrical, or disk-shaped, body having circular end surfaces at first end 78 and second end 80. Side portion 82 comprises an annular wall that connects first end 78 and second end 80. However, in other embodiments, extension body 76 may have other geometries, such as an octagonal shape. In any embodiment, extension body 76 and coupler body 64 have the same or similar geometries such that isolation diaphragm 58A can be pinned between isolator fitting 54A and process coupling 56A.

Figure 6:
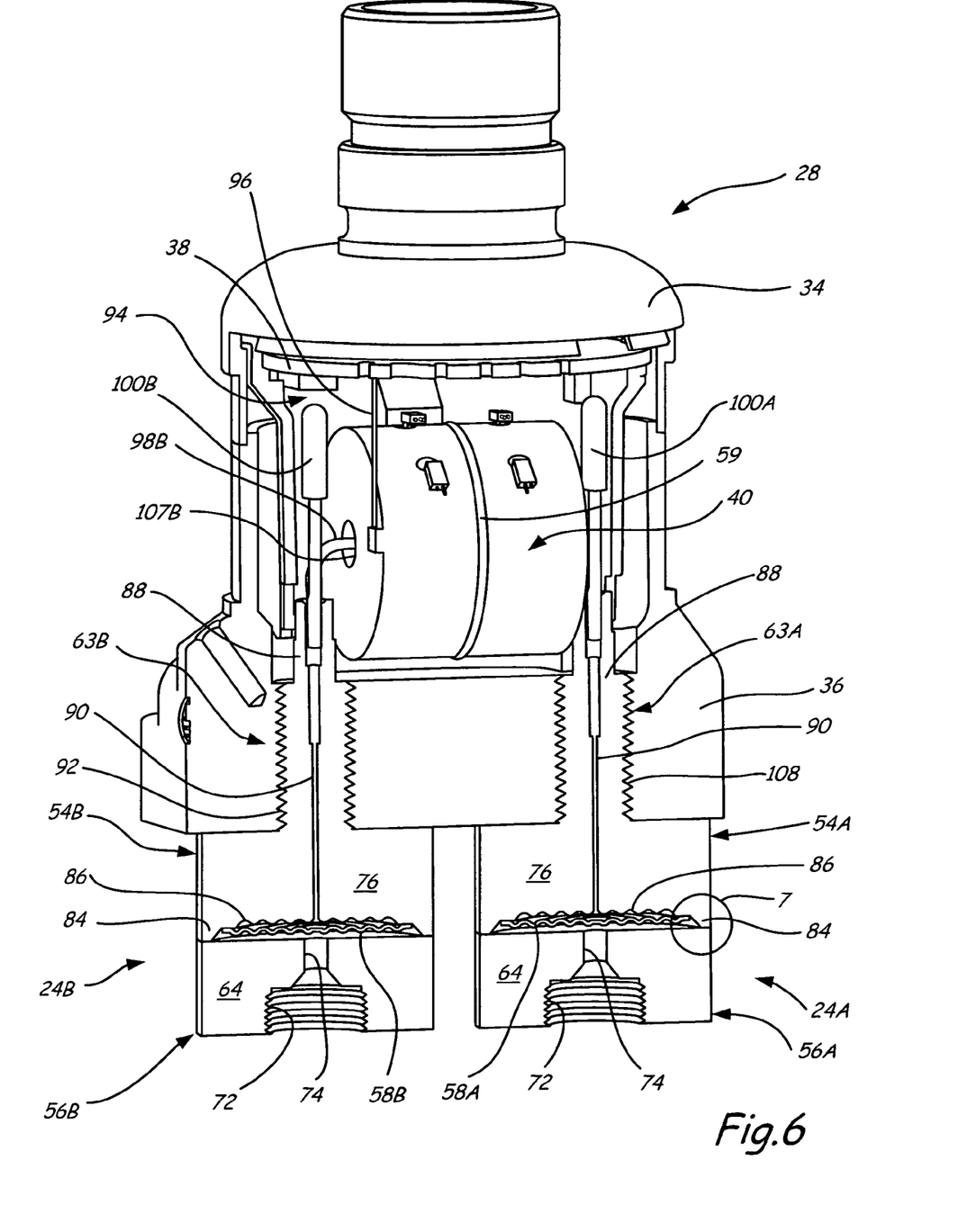
FIG. 6 shows cross-sections of the isolation diaphragm sub-assembly of FIG. 3 as installed in a base of a process transmitter sensor module.
Figure 7:
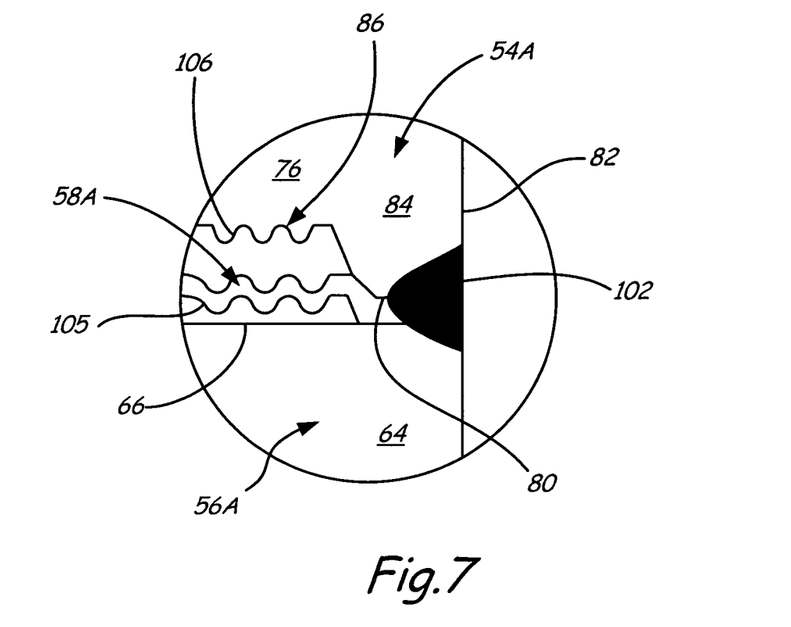
FIG. 7 is a close-up view of callout 7 of FIG. 6, showing a weld joint between the process coupling, isolation diaphragm and isolator fitting.

Second end 80 of extension body 76 is configured to mate with first surface 66 of coupler body 64 of process coupling 56A. Extension body 76 includes flange 84, which produces a pressure chamber at second end 80. Flange 84 preferably circumscribes corrugated pressure chamber face 86 and through-hole 90. Flange 84 provides a surface upon which isolation diaphragm 58A can be mounted. Isolation diaphragm 58A comprises a thin metal disk that becomes trapped between isolator fitting 54A and process fluid coupling 56A. As explained with reference to FIGS. 6 and 7, isolation diaphragm 58A is preferably first joined to sub-assembly 24A through a welded joint and then shaped to include corrugations by applied pressure. Elongate neck 88 extends concentrically from first end 78. Through-hole 90 extends through both elongate neck 88 and extension body 76 to intersect corrugated pressure chamber face 86. Elongate neck 88 comprises a cylindrical body having threads 92 for connecting with mating threads in base 36 of sensor module 28, as shown in FIG. 6.

FIG. 6 shows cross-sectional views of isolation diaphragm sub-assemblies 24A and 24B of FIG. 3 as installed in base 36 of process transmitter sensor module 28. Sensor module 28 includes housing 34, base 36, sensor board 38 and sensor 40. Housing 34 forms interior 94, which comprises a space in which components of sensor module 28 are hermetically sealed when assembled with sub-assemblies 24A and 24B. Sensor board 38 is disposed within interior 94 of housing 34 and connects to sensor 40 through sensor cable 96. Sensor 40 includes diaphragm 59 which deflects as a result of pressure changes in hydraulic fluid present in isolation tubes connecting sensor 40 to sub-assemblies 24A and 24B. Isolation tube 98B extends from hydraulic fluid inlet 107B on sensor 40 to elongate neck 88 on sub-assembly 24B. Fill tube 100B also extends into elongate neck 88 and comprises a port into which hydraulic fill fluid is introduced into isolation tube 98B. Likewise, sub-assembly 24A is connected to an inlet on sensor 40 through an isolation tube connected with fill tube 100A at a neck of isolator fitting 54A. Sub-assemblies 24A and 24B are pre-fabricated before being assembled with sensor module 34.

As shown in FIG. 7, sub-assemblies 24A and 24B are fabricated by forming weld 102 at the junction of extension body 76, coupler body 64 and isolation diaphragm 58A. Isolation diaphragm 58A is positioned adjacent first surface 66 of coupler body 64 and second surface 80 of extension body 76. Extension body 76, coupler body 64 and isolation diaphragm 58A have the same outer diameter, or outer perimeter, as the case may be, such that they are stacked in coaxial alignment. Weld 102 is placed along the entire perimeter of side surface 70 of body 64 and the entire perimeter of side portion 82 of body 76.

Figure 8:
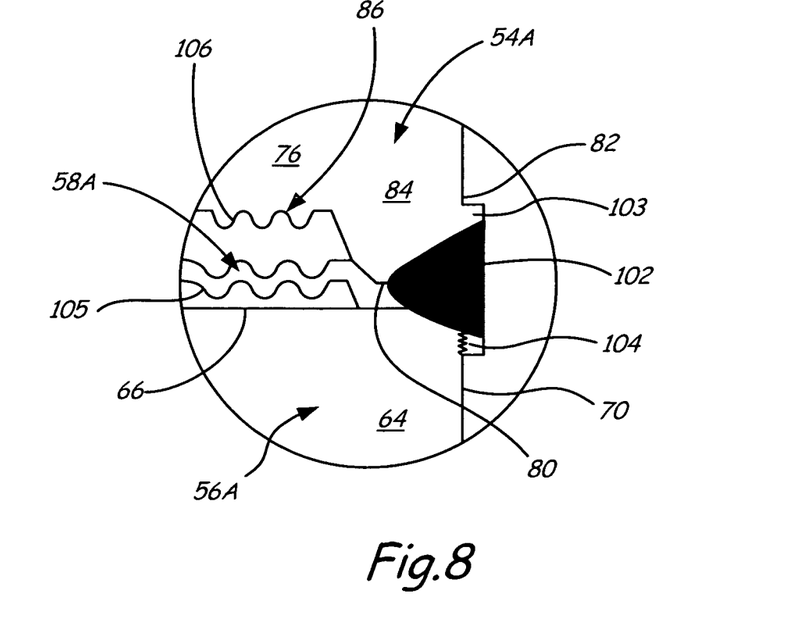
FIG. 8 shows a threaded joint between the process coupling and the isolator fitting of FIG. 7.

FIG. 8 shows another embodiment of sub-assembly 24A in which extender body 76 is threaded with coupler body 64 to enhance weld 102. Coupler body 76 includes annular coupling flange 103 that circumscribes first surface 66. Flange 103 includes interior threads for mating with exterior threads on side portion 82 of body 76 to form threaded engagement 104. Weld 102 is then positioned to also penetrate threaded engagement 104 of flange 103 to provide additional burst strength.

Weld 102 penetrates into side surface 70, side portion 82 and diaphragm 58A to form a deep weld having uniform properties to produce a strong bond between bodies 76 and 64. Weld 102, however, does not penetrate through flange 84 to reach portions of diaphragm 58A adjacent corrugated pressure chamber face 86 so as to avoid damaging or weakening diaphragm 58A. In one embodiment, bodies 64 and 76 and diaphragm 58A are comprised of stainless steel. However, diaphragm 58A may be comprised of Hastelloy®, which is a registered trademark of Haynes International, Inc., Monel® or Inconel®, which are registered trademarks of Inco Alloys International, Inc., Tantalum or other materials known in the art. Weld 102 can be produced using various welding techniques, such as electron beam welding, TIG welding or laser welding. Diaphragm 58A initially comprises a flat disk without corrugations 105. However, corrugations 105 are pressure formed by pressure from a process fluid or from a fluid applied during manufacturing. The applied pressure forces diaphragm 58A against corrugations 106 of pressure chamber face 86. Shaping of diaphragm 58A in such a manner avoids having to align a pre-corrugated diaphragm with throughbore 74 and through-hole 90.

Returning to FIG. 6, assembled sub-assemblies 24A and 24B are connected to base 36 by screwing threads 92 into mating threads 108 in receiving bores 63A and 63B of base 36. Neck 88 preferably is taller than base 36 such that a portion of neck 88 extends into interior 94 of housing 34. Thus, neck 88 extends close to inlets of sensor 40, such as inlet 107B. Threads 92 of neck 88 do not extend along the portion of neck 88 extending into interior 94. Isolation tube 98B joins inlet 107B to through-hole 90 in neck 88. Fill tube 100B also extends into through-hole 90 in neck 88. At the tip of neck 88, through-hole 90 is sealed with brazing or welding to join fill tube 100B and isolation tube 98B to neck 88. A hydraulic fill fluid is introduced into through-hole 90 through fill tube 100B to completely fill up isolation tube 98B, fill tube 100B, through-hole 90 and the portion of the pressure chamber between pressure chamber face 86 and isolation diaphragm 58B. Fill tube 100B is then sealed with a cap, weld, braze or combination thereof to prevent leakage of the fill fluid. As such, pressure applied to isolation diaphragms 58A and 58B from a process fluid is transmitted to sensor 40 through the fill fluid. Welds 102 (FIG. 7) prevent large static pressures from compromising the integrity of sealed connection between base 36 and the process fluid source.

Figure 9:
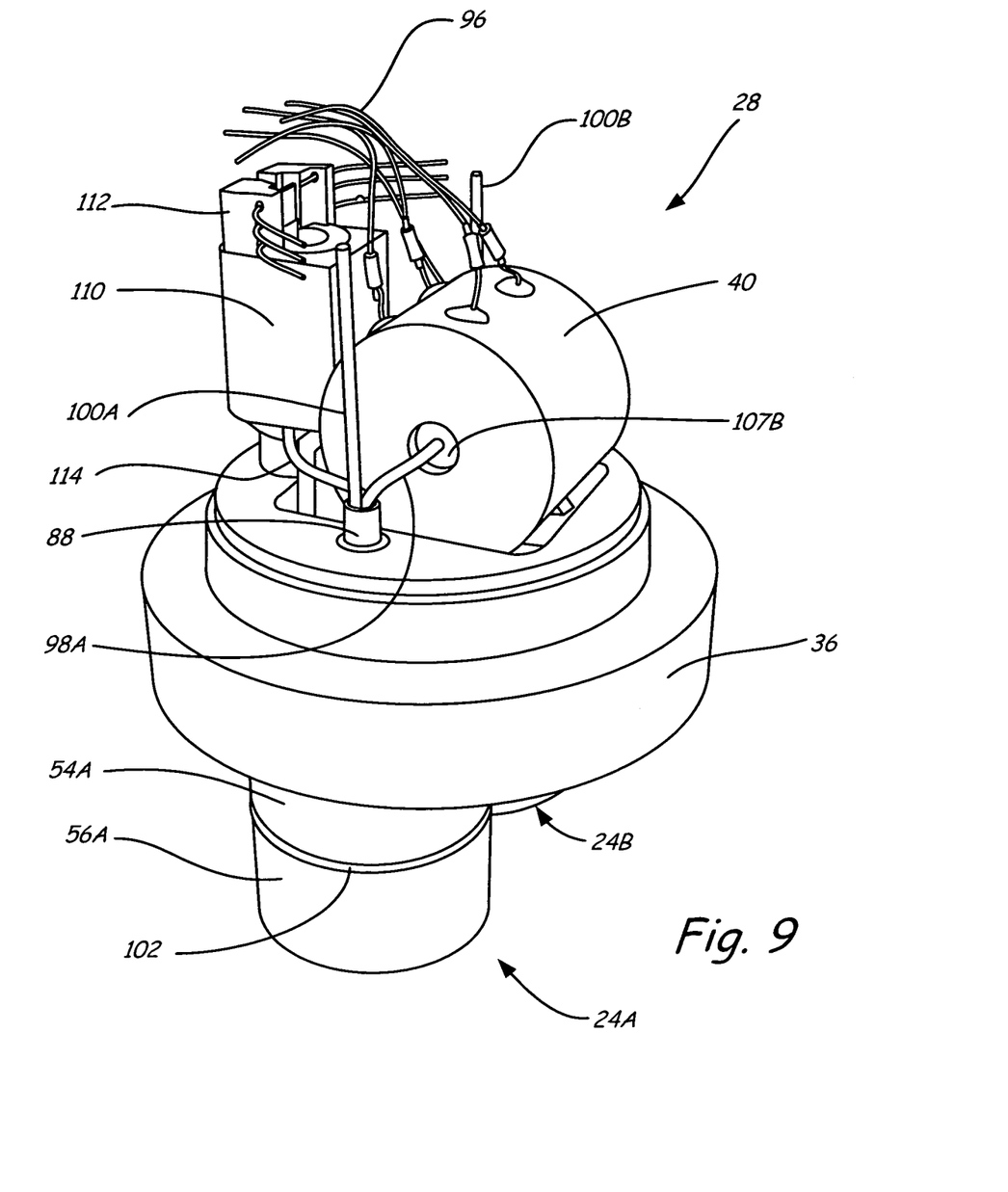
FIG. 9 shows a perspective view of a sensor module having a static pressure sensor coupled to a high static pressure isolation diaphragm sub-assembly.

FIG. 9 shows a perspective view of one embodiment with sensor module 28 having static pressure sensor 110 coupled to isolation diaphragm sub-assembly 24A. Static pressure sensor 110 includes sensor wiring 112 and isolation tube 114. Sensor module 28 includes base 36 that connects to housing 34 as shown in FIG. 6. Base 36 is typically welded to housing 34 to from hermetically sealed interior 94 (FIG. 6) when joined with sub-assemblies 24A and 24B. Differential pressure sensor 40 and static pressure sensor 110 are mounted to base 36 and are collectively in fluid communication with hydraulic fluid in isolator fittings 54A and 54B. Differential pressure sensor 40 is connected to neck 88 of isolator fitting 54A by isolation tube 98A. Likewise, sensor 40 is connected to neck 88 of isolator fitting 54B (FIG. 6) such that a differential pressure is sensed. Static pressure sensor 110 is, however, only connected to a single isolator fitting such that a static pressure is sensed. In the embodiment shown, static pressure sensor 110 is connected to neck 88 of isolator fitting 54A via sensor tube 114. Static pressure sensor 110 comprises any suitable sensor as is known in the art. For example, sensor 110 may comprise a strain gage sensor or a capacitive sensor.

Neck 88 of sub-assembly 24A provides an access point into a hydraulic fill fluid system that fluidly connects isolation diaphragm 58A (FIG. 3) with sensor 40 and sensor 110. Both isolation tube 114 and isolation tube 98A access the hydraulic system through neck 88. Thus, an additional bore within base 36 to connect sensor 112 with the process fluid pressure is unnecessary. Thus, the ability to seal interior 94 is more easily accomplished because of fewer access points through base 36. Sensors 40 and 110 are positioned on base 36 such that isolation tubes 114 and 98A have easy access to neck 88. Likewise, wiring 96 of sensor 40 and wiring 112 of sensor 110 are easily connected to sensor board 38 within housing 34 (FIG. 2) when so positioned on base 36.

Sub-assemblies 24A and 24B of the present invention provide modular connectors capable of withstanding high static line pressures, such as within impulse piping 26. Process couplings 56A and 56B are welded to isolator fittings 54A and 54B to simultaneously trap isolation diaphragms 58A and 58B, respectively. The seals formed by welds 102 can be checked before sub-assemblies 24A and 24B are assembled with base 36. For example, sub-assemblies 24A and 24B can be helium leak tested to check weld 102. Tests have shown that welds 0.120 in (~3.0 mm) deep can survive burst pressures up to approximately 80,000 psi (~551.6 MPa). Welds 0.080 in (~2.0 mm) deep can survive 50,000 cycles at 15,000 psi (~103.4 MPa).

Sub-assemblies 24A and 24B further provide protection against damage of isolation diaphragms 58A and 58B after assembly with flange 38. In the event sensor 40 becomes compromised, losing fill fluid, diaphragm 58A will be forced against corrugated pressure chamber surface 86 by the pressure of the process fluid. The small-diameter of through-hole 90 prevents diaphragm 58A from experiencing further corruption, such as tearing, thereby preventing major leakage. Furthermore, sub-assemblies 24A and 24B are assembled with base 36 using flame-proof paths, such as provided by threaded or brazed connections, that also assist in hermetically sealing interior 94 and improving the safety of transmitter 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment(s) disclosed, but that the invention will include all embodiments falling within the scope of the appended claims.

The invention claimed is:

1. A process transmitter for measuring a process variable, the process transmitter comprising:
   a sensor module comprising a sensor for measuring a process variable of an industrial process and for generating a sensor signal, wherein the sensor includes a hydraulic fluid inlet within the module; and
   a first static pressure coupling connected to the sensor module, the first static pressure coupling comprising:
      a first isolator fitting inserted into the sensor module and connected to the hydraulic fluid inlet;
      a first process fluid coupling joined to the first isolator fitting; and
      a first isolation diaphragm positioned between the first isolator fitting and the first process fluid coupling outside of the sensor module.

2. The process transmitter of claim 1 wherein the first isolator fitting, the first process fluid coupling and the first isolation diaphragm are joined together at a single weld.

3. The process transmitter of claim 2 wherein the sensor module comprises:
   a housing having an interior containing the sensor;
   a flexible sensor element disposed within the sensor, a position of which corresponds to a magnitude of the sensor signal;
   a module base connected to the housing and having a first receiving bore extending through the base to connect to the interior of the housing;
   an isolation tube connecting the hydraulic fluid inlet to the first isolator fitting; and
   a fill fluid disposed within the isolation tube and the first isolator fitting to influence a position of the flexible sensor element based on a position of the first isolation diaphragm.

4. The process transmitter of claim 3 and further comprising a transmitter electronics module mounted to the sensor module, the transmitter electronics module having transmitter circuitry connected to the sensor.

5. The process transmitter of claim 3 wherein the first isolator fitting comprises:
   an extension body including:
      a first end positioned adjacent to the sensor module base;
      a second end having a corrugated pressure chamber face;
      a flange surrounding the corrugated pressure chamber face; and
      a side portion connecting the first side to the second side;
   an elongate neck extending from the first end through the first receiving bore; and
   a through-hole extending through the elongate neck and the extension body to intersect the corrugated pressure chamber face.

6. The process transmitter of claim 5 wherein the first process fluid coupling comprises:
   a coupler body including:
      a first surface that mates with the flange;
      a second surface having a process inlet port;
      a through-bore extending from the process inlet port to the first surface to face the corrugated pressure chamber face; and
      a side portion connecting the first surface to the second surface;
   wherein the first isolation diaphragm is disposed between the first surface of the coupler body and the flange of the first isolator fitting.

7. The process transmitter of claim 6 wherein the elongate neck and the first receiving bore engage along a flame-quenching path.

8. The process transmitter of claim 7 wherein the elongate neck includes threads engaged with threads on the receiving bore.

9. The process transmitter of claim 7 wherein the elongate neck is force-fit into the receiving bore and brazed.

10. The process transmitter of claim 6 wherein the first process fluid coupling is in threaded engagement with the first isolator fitting.

11. The process transmitter of claim 3 and further comprising:
   a static pressure sensor disposed within the interior of the housing, the static pressure sensor having an isolation tube extending from the static pressure sensor to the isolator fitting.

12. The process transmitter of claim 3 and further comprising:
   a second static pressure coupling having a second isolator fitting, a second process fluid coupling, and a second isolation diaphragm connected between the second isolator fitting and second process fluid coupling;
   wherein:
      the sensor comprises a differential pressure sensor having a second hydraulic fluid inlet disposed within the interior;
      the base includes a second receiving bore parallel with the first receiving bore; and
      the second isolator fitting extends through the second receiving bore and connects with the second hydraulic fluid inlet such that the first isolation diaphragm and the second isolation diaphragm are arranged in an aligned-surface arrangement.

13. The process transmitter of claim 3 wherein the module base and the first process fluid coupling are hermetically sealed with the housing.

14. The process transmitter of claim 1 wherein the first isolation diaphragm is joined to the first isolator fitting and the first process fluid coupling.

15. A pressure transmitter for use in industrial process control systems, the pressure transmitter comprising:
   a sensor module comprising:
      a differential pressure sensor for sensing a pressure differential in a process fluid;
      a housing in which the differential pressure sensor is positioned;
      a co-planar base having first and second receiving bores; and
      first and second isolation tubes extending from the differential pressure sensor toward the first and second through bores, respectively;
   a process fluid connection comprising:
      first and second isolator fittings inserted into the sensor module through the first and second receiving bores, respectively;
      first and second process fluid couplings joined to the first and second isolator fittings, respectively; and
      first and second isolation diaphragms positioned between the first and second isolator fittings and the first and second process fluid couplings, respectively; and
   a transmitter module connected to the sensor module, the transmitter module containing transmitter circuitry for processing output of the pressure sensor.

16. The pressure transmitter of claim 15 and further comprising:
   a first weld joining together the first isolator fitting, the first process fluid coupling and the first isolation diaphragm; and
   a second weld joining together the second isolator fitting, the second process fluid coupling and the second isolation diaphragm.

17. The pressure transmitter of claim 16 wherein the first and second isolator fittings each comprise:
   an extension body including:
      a first side positioned adjacent to the co-planar base;
      a second side having a corrugated pressure chamber face;
      a flange surrounding the corrugated pressure chamber face; and
      a side portion connecting the first side to the second side;
   an elongate neck extending from the first side through one of the receiving bores; and
   a through-hole extending through the elongate neck and the extension body to engage the corrugated pressure chamber face.

18. The pressure transmitter of claim 17 wherein the first and second process fluid couplings each comprises:
 a coupler body including:
  a first surface configured to mate with a flange of an isolator fitting;
  a second surface having a process inlet port;
  a through-bore extending from the process inlet port to the first surface in order to face a corrugated pressure chamber face; and
  a side portion connecting the first surface to the second surface;
 wherein an isolation diaphragm is disposed between the first surface and the flange.

19. The pressure transmitter of claim 18 wherein the elongate necks of the first and second isolator fittings include threads engaged with threads on the first and second receiving bores, respectively.

20. The pressure transmitter of claim 15 and further comprising:
 a static pressure sensor disposed within the housing, the static pressure sensor having an isolation tube extending from the static pressure sensor to the first isolator fitting.

21. The pressure transmitter of claim 15 wherein:
 the first and second isolator fittings are inserted into the housing of the sensor module; and
 the first and second process fluid couplings are joined to the first and second isolator fittings outside of the housing of the sensor module;
 such that the first and second isolation diaphragms are positioned outside of the housing of the sensor module.

22. A coupling for connecting a process transmitter to a process fluid, the coupling comprising:
 an isolator fitting body comprising:
  a corrugated pressure chamber face;
  an isolator flange surrounding the corrugated pressure chamber face;
  an elongate neck extending from the isolator fitting body; and
  a through-hole extending through the elongate neck and the isolator fitting body to intersect the corrugated pressure chamber face;
 a process fluid coupling body comprising:
  a first surface conjoined with the isolator flange of the isolator fitting body;
  a second surface having a process inlet port;
  a through-bore extending from the process inlet port to the first surface to face the corrugated pressure chamber face; and
 an isolation diaphragm disposed between the first surface of the process fluid coupling body and the isolator flange of the isolator fitting body.

23. The coupling of claim 22 and further comprising:
 a weld joint circumscribing the isolator fitting body, the process fluid coupling body and the isolation diaphragm.

24. The coupling of claim 22 and further comprising threads along the elongate neck.

25. The coupling of claim 22 and further comprising:
 a coupling flange extending from the isolator fitting body to circumscribe the first surface of the process fluid coupling body; and
 a threaded engagement between the process fluid coupling body and the coupling flange of the isolator fitting body.

* * * * *

UNITED STATES PATENT AND TRADEMARK OFFICE
CERTIFICATE OF CORRECTION

PATENT NO.        : 8,448,519 B2                                          Page 1 of 1
APPLICATION NO.   : 12/924761
DATED             : May 28, 2013
INVENTOR(S)       : David Andrew Broden et al.

It is certified that error appears in the above-identified patent and that said Letters Patent is hereby corrected as shown below:

On the Title Page
(75) Inventors: Second Inventor incorrect spelling of last name.
  Delete "Horkey"
  Insert --Horky--

Signed and Sealed this
Second Day of July, 2013

Teresa Stanek Rea
*Acting Director of the United States Patent and Trademark Office*